No. 846,223. PATENTED MAR. 5, 1907.
T. MARSHALL.
MEANS FOR MAINTAINING CONSTANT THE VOLTAGE OF AN ELECTRIC CIRCUIT.
APPLICATION FILED JAN. 10, 1907.
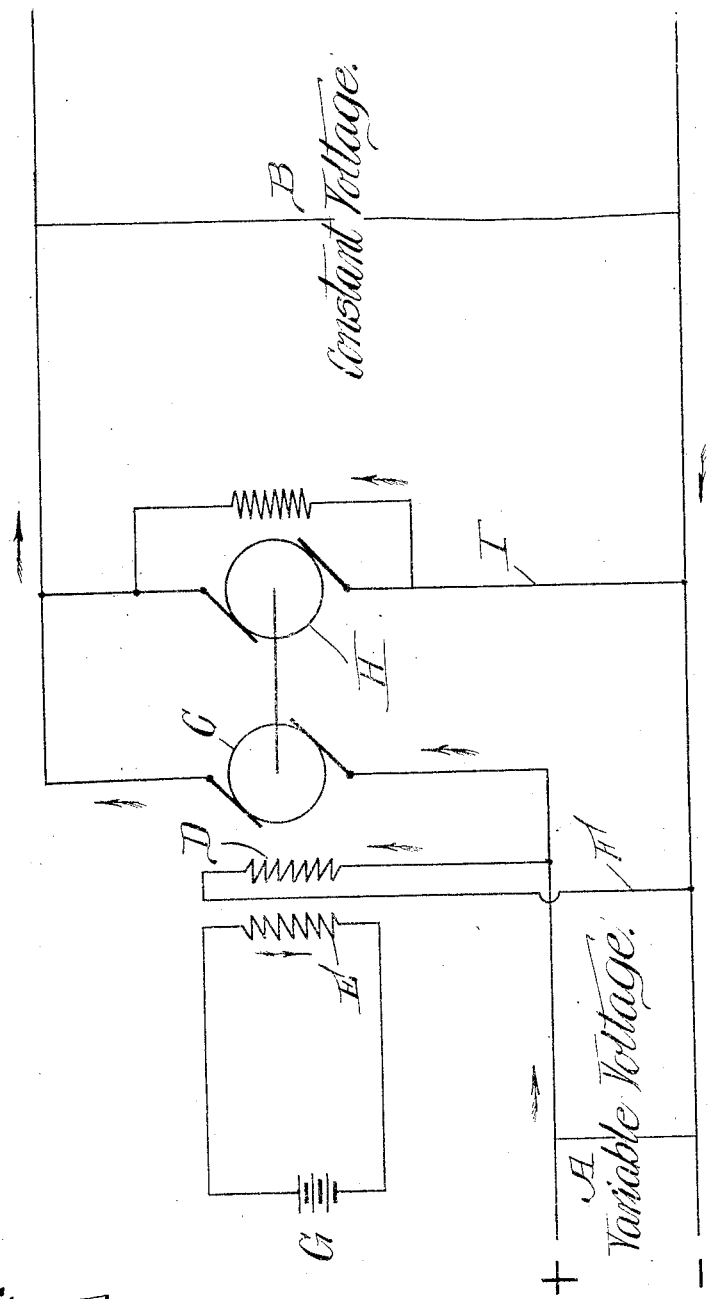

UNITED STATES PATENT OFFICE.

THOMAS MARSHALL, OF CHICAGO, ILLINOIS.

MEANS FOR MAINTAINING CONSTANT THE VOLTAGE OF AN ELECTRIC CIRCUIT.

No. 846,223.  Specification of Letters Patent.  Patented March 5, 1907.

Application filed January 10, 1907. Serial No. 351,683.

*To all whom it may concern:*

Be it known that I, THOMAS MARSHALL, a citizen of the United States, residing at Chicago, in the county of Cook and State of Illinois, have invented certain new and useful Improvements in Means for Maintaining Constant the Voltage of an Electric Circuit, of which the following is a full, clear, and exact specification.

This invention relates to a system of circuits and devices for maintaining constant the voltage of an electric circuit; and it has for its primary object to provide improvements whereby as the voltage of such circuit falls below a certain value the deficiency will be automatically supplied.

Another object of the invention is to utilize the current of a variable-voltage circuit for neutralizing or opposing the field of an electric generator and to add to the circuit in which a constant voltage is to be maintained the voltage which results in the generator from a variation in the strength of such field.

With the view to the attainment of these ends and the accomplishment of certain other objects, which will hereinafter appear, the invention consists in the features of novelty which will now be described with reference to the accompanying drawing and more particularly pointed out in the claims.

The said drawing is a diagrammatic illustration of the circuits and devices constituting an embodiment of this invention.

A is a circuit of variable voltage, and B a circuit of constant voltage.

C is a generator which is connected with these two circuits and which is provided with two fields D E, which are so wound as to oppose each other. The field D is connected across the circuit A by conductor F, while the field E is connected across some suitable source of constant potential G, the strength of field E being equal to that of field D when the voltage of the variable-voltage circuit A is equal to that to be maintained across the constant-voltage circuit B. The generator C is connected to a motor H, which in this exemplification of the invention is represented as an electric motor connected across the constant-voltage circuit B by conductor I and being directly connected with the generator C in any suitable way, so as to drive the latter.

With this arrangement of devices and circuits it will be seen that the field E, being constant, and the field D, varying with every variation in the variable-voltage circuit A, the voltage generated by the generator C will be directly proportional to the difference in voltage between the two circuits A B, and as a consequence the deficiency resulting in a decrease of voltage in A will be automatically supplied to B, and as the voltage in A again rises to normal the value of field D will be proportionately increased until eventually completely counterbalancing the field E, and when the neutralization of the two fields is complete this compensating supply of current from the generator C will cease. In order to perfectly accomplish this result, it is of course quite essential that the speed of the generator C remain approximately constant, and for that reason it is desirable that it be driven by an electric motor, such as H, and that this motor be supplied with current from the constant-voltage circuit, as shown.

In order that the invention might be fully understood by those skilled in the art, the details of the foregoing embodiments thereof have been thus specifically described; but

What I claim as new therein, and desire to secure by Letters Patent, is—

1. In a system for maintaining a constant voltage in an electric circuit, the combination of a variable-voltage circuit, a generator having a field connected across the variable-voltage circuit, a constant-voltage circuit connected with the generator and the variable-voltage circuit, and an unvarying field opposing or neutralizing the first said field.

2. In a system for maintaining a constant voltage in an electric circuit, the combination of a variable-voltage circuit, a generator having a field connected across the variable-voltage circuit, a constant-voltage circuit connected with the generator and the variable-voltage circuit, a second field arranged to oppose the first said field, and a constant-potential circuit supplying the second said field.

3. In a system of maintaining a constant voltage in an electric circuit, a generator having a field connected across the variable-voltage circuit, a constant-voltage circuit connected with the generator and the variable-voltage circuit, an unvarying field opposing or neutralizing the first said field, and a motor for driving the generator connected with the constant-voltage circuit.

In testimony whereof I have signed my name to this specification, in the presence of two subscribing witnesses, on this 4th day of January, A. D. 1907.

THOMAS MARSHALL.

Witnesses:
J. H. JOCHUM, Jr.,
FRANCIS M. LOWES.